United States Patent
Osborne

(10) Patent No.: US 6,941,425 B2
(45) Date of Patent: Sep. 6, 2005

(54) METHOD AND APPARATUS FOR READ LAUNCH OPTIMIZATIONS IN MEMORY INTERCONNECT

(75) Inventor: Randy B. Osborne, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 305 days.

(21) Appl. No.: 10/010,994

(22) Filed: Nov. 12, 2001

(65) Prior Publication Data

US 2003/0093631 A1 May 15, 2003

(51) Int. Cl.$^7$ .............................................. G06F 13/00
(52) U.S. Cl. ........................ 711/154; 711/100; 710/20; 710/21
(58) Field of Search ................ 711/100, 154; 710/20, 21

(56) References Cited

U.S. PATENT DOCUMENTS

| | | |
|---|---|---|
| 5,522,059 A | 5/1996 | Marushima et al. |
| 5,636,364 A | 6/1997 | Emma et al. |
| 6,047,348 A | 4/2000 | Lentz et al. |
| 6,076,139 A | 6/2000 | Welker et al. |
| 6,092,158 A | 7/2000 | Ajanovic et al. |
| 6,247,084 B1 | 6/2001 | Apostol, Jr. et al. |
| 6,266,747 B1 * | 7/2001 | Dahl et al. ................... 711/154 |
| 6,285,679 B1 | 9/2001 | Carvey et al. |
| 6,295,581 B1 | 9/2001 | Deroo |
| 6,487,626 B2 | 11/2002 | Gray et al. |
| 2001/0038634 A1 | 11/2001 | Dally et al. |
| 2002/0065924 A1 * | 5/2002 | Barrall et al. ................ 709/227 |

FOREIGN PATENT DOCUMENTS

EP    0 477 406 B1    4/1992

OTHER PUBLICATIONS

Li–Shiuam Peh et al. "Flit–reservation flow control", High–Performance Computer Architecture, 2000. HPCA—6. Proceedings, Sixth International Symposium on Toulouse, France. Jan. 8–12, 2000, Los Alamitos, CA. IEEE Comput. Soc. US, pp. 73–84. XP010371892 ISBN 0–7695–0550–3.

Iyer R, Bhuyan Ln, Nanda A: Using Switch Directories to Speed Up Cache–to–Cache Transfers in CC–NUMA Multiprocessors, CA Conference Article, May 5, 2000, XP002248955, Cancun Mexico.

Li–Shiuan Peh et al: "Flow Control and Micro–Architectural Mechanisms for Extending the Performance of Interconnection Networks; 17–36, 105–138" XP002248956, Stanford University, retrieved from www–cs–students.stanford.edu on Jul. 24, 2003.

* cited by examiner

Primary Examiner—Pierre M. Vital
Assistant Examiner—Midys Inoa
(74) Attorney, Agent, or Firm—Blakely, Sokoloff, Taylor and Zafman

(57) ABSTRACT

A method and apparatus for the optimization of memory read operations via read launch optimizations in memory interconnect are disclosed. In one embodiment, a write request may be preempted by a read request.

32 Claims, 19 Drawing Sheets

| Transfer | BITS 17:0 |
|---|---|
| 0 | Lower Order Address Bits and Read/Write Command |
| 1 | Higher Order Address Bits and Early Read Indicator |
| 2 | Command Destination, Offset from Address, Transaction ID, Check Bits, Mask Bits, Stream ID, Size Bits, Cancel Command, Priority, etc. |
| 3 | |

FIG. 13

| ↓Transfer | BITS 17:0 |
|---|---|
| 0 | Lower Order Address Bits and Read/Write Command |
| 1 | Higher Order Address Bits and Early Read Indicator |
| 2 | Command Destination, Offset from Address, Transaction ID, Check Bits, Mask Bits, Size Bits, etc. |
| 3 | |

FIG. 14

| ↓Transfer | BITS 17:0 |
|---|---|
| 0 | Lower Order Configuration Address Bits and Read/Write Command |
| 1 | Higher Order Configuration Address Bits and Early Read Indicator |
| 2 | Command Destination, Offset from Address, Transaction ID, Check Bits, Mask Bits, etc. |
| 3 | |

| LL signals | Transfers 0:3 |
|---|---|
| 0 | Info and Check Bits |
| 1 | Header, Tail, and Check Bits |
| 2 | Extended Mode Bits |
| 3 | |

| LL signals | Transfers 0:3 |
|---|---|
| 0 | Type and Check Bits |
| 1 | |
| 2 | Info and Check Bits |
| 3 | |

FIG. 17

| LL signals | Transfers 0:3 |
|---|---|
| 0 | Tag, Control, and Check Bits |
| 1 | |
| 2 | Tag, Info, and Check Bits |
| 3 | |

FIG. 18

| LL Signals | Transfers 0:3 |
|---|---|
| 0 | Tag and Check Bits |
| 1 | |
| 2 | Tag, Info, and Check Bits |
| 3 | |

FIG. 19

| LL signals | Transfers 0:3 |
|---|---|
| 0 | Signal and Check Bits |
| 1 | |
| 2 | Signal, Info, Stop, and Check Bits |
| 3 | |

FIG. 20

METHOD AND APPARATUS FOR READ LAUNCH OPTIMIZATIONS IN MEMORY INTERCONNECT

FIELD OF THE INVENTION

The present invention pertains to memory connections. More particularly, the present invention relates to a method and apparatus for the optimization of memory read operations via read launch optimizations in memory interconnect.

BACKGROUND OF THE INVENTION

As microprocessors become faster, the need for faster memory interconnects increases. Microprocessor performance has increased dramatically. System performance has generally not kept pace with the increased performance of microprocessors due to a variety of reasons. One reason is the mechanical nature of mass storage devices such as hard disk drives.

Another area affecting system performance is memory external to the microprocessor. This memory may consist of both external high-speed cache and external generally lower speed, but larger in size, main memory. Accesses to external memory may have latency and implementation complexity that affect performance. The ability to reduce latency and reduce implementation complexity is beneficial. A protocol with optimizations for interconnecting with a memory is also beneficial.

BRIEF DESCRIPTION OF THE DRAWINGS

The present invention is illustrated by way of example and not limitation in the figures of the accompanying drawings, in which like references indicate similar elements and in which:

FIG. 13 illustrates, according to one embodiment, a memory command format;

FIG. 14 illustrates, according to one embodiment, a device command format;

FIG. 15 illustrates, according to one embodiment, a configuration command format;

FIG. 16 illustrates, according to one embodiment, an outbound link layer format;

FIG. 17 illustrates, according to one embodiment, common inbound link layer format bits;

FIG. 18 illustrates, according to one embodiment, a read return header format;

FIG. 19 illustrates, according to one embodiment, a write acknowledgement format; and FIG. 20 illustrates, according to one embodiment, a status format.

DETAILED DESCRIPTION

A method and apparatus for the optimization of memory read operations via read launch optimizations in memory interconnect are described.

In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention.

Figure 1:
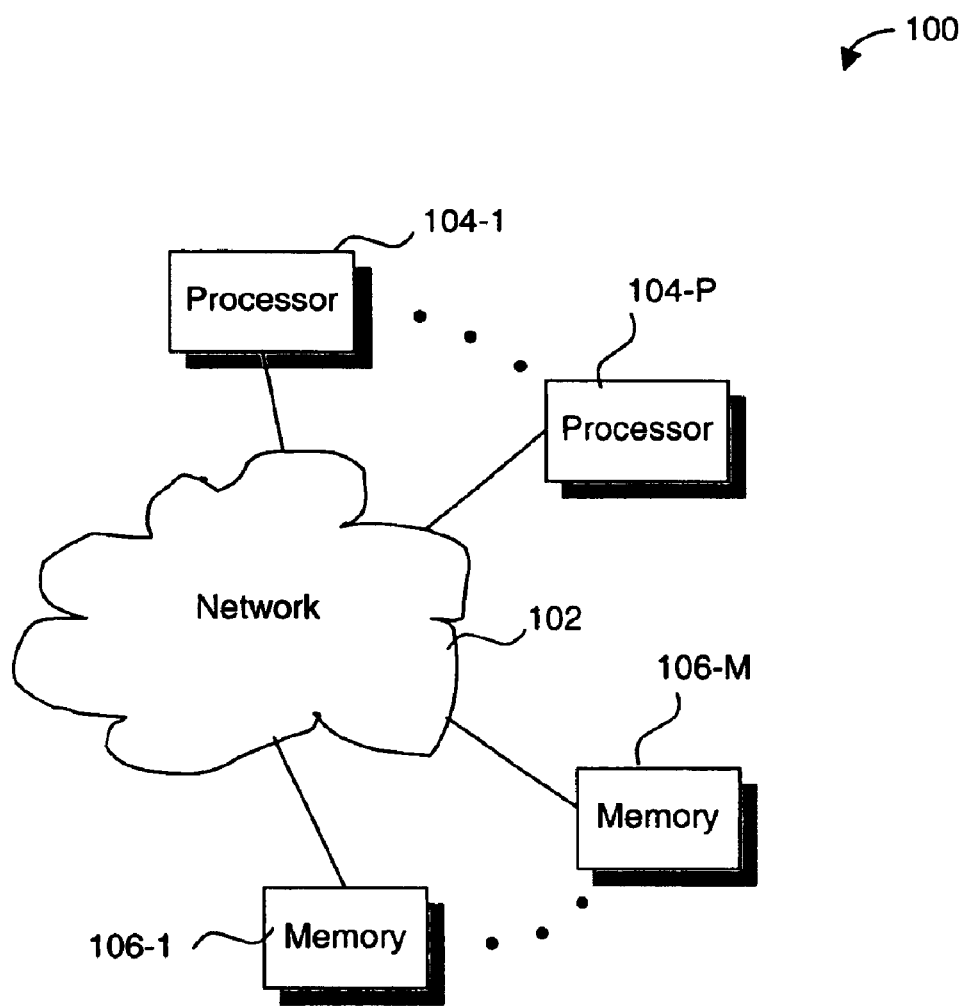
FIG. 1 illustrates, according to one embodiment, a network environment in which the present invention may be practiced.

FIG. 1 illustrates a network environment 100 in which the techniques described may be applied. As shown, several processors 104-1 through 104-P and memory 106-1 through 106-M are connected to each other via a network 102, which may be, for example, a computer bus. Note that alternatively the network 102 might be or include a local network. The method and apparatus described herein may be applied to essentially any type of communicating means or device whether local or remote.

Figure 2:
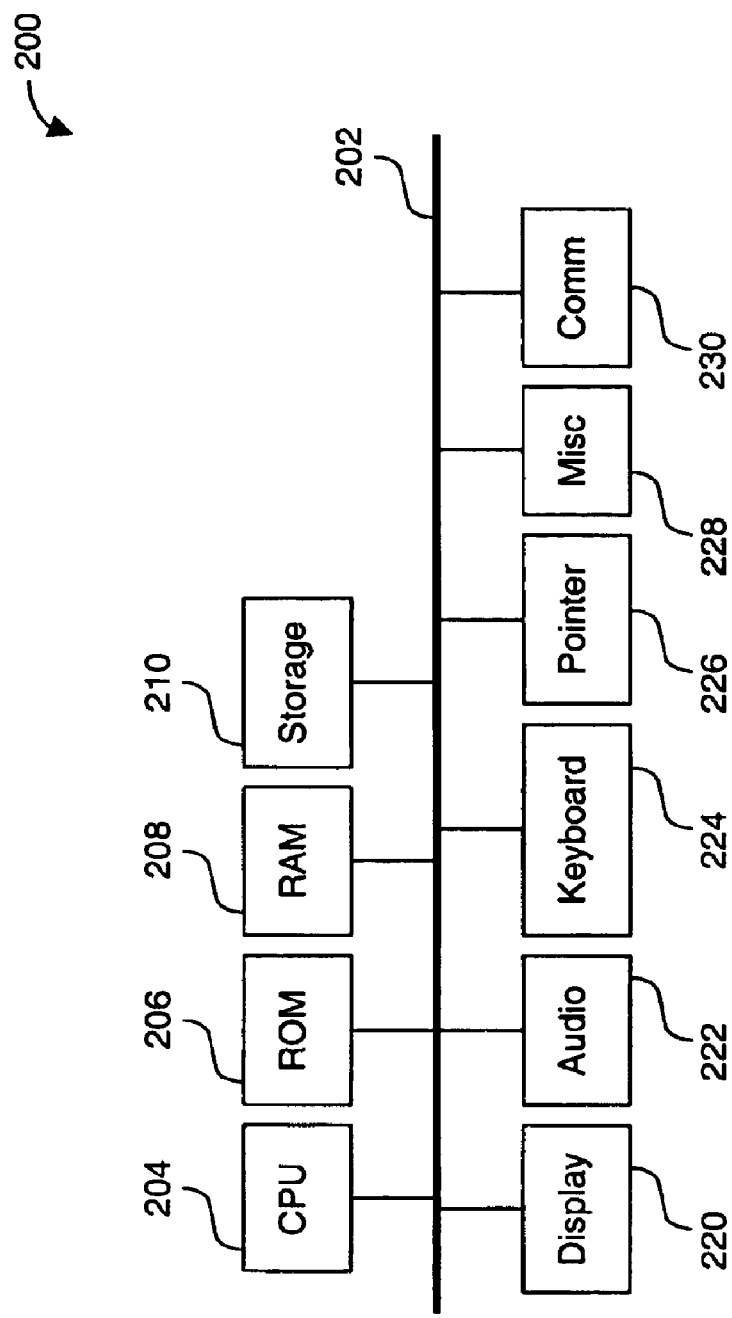
FIG. 2 illustrates, according to one embodiment, a block diagram of a computer system.

FIG. 2 illustrates a computer system 200 in block diagram form, in which, in one embodiment, the present invention may be practiced. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Additionally, the subsystem exemplified by the CPU 204 may have a separate bus to other subsystems, for example, memory. One such example may be for graphics, such as the AGP. Another may be a memory port interface to memory external to the CPU 204 such as ROM 206, RAM 208, etc.

What is to be appreciated, as detailed below, is that a memory port interface and/or protocol that can speed up operations and/or reduce latency and/or complexity is beneficial. For example, in a read request to a memory, it is possible, as is described below, by first sending only that information that is needed to launch a memory read the actual reading of the memory may be started in advance of receiving all of the read request. For example, if the addresses are sent first then a memory subsystem may begin the reading of the memory contents. It may be that the read request only wants a byte out of a word that is being accessed, however, this byte only information may be sent after the addresses and arrive in time for the memory subsystem to then only send the requested byte. In this way, operations may proceed in parallel and/or in advance of others. Similarly, if the memory subsystem knows that it has accessed memory and will have a result after a fixed time, it is possible, as is described below, to send a read return header in advance of the actual data. This may allow the device receiving the data to prepare for it by knowing that it is coming. For example, the read return header may have information that identifies which read request the coming data is associated with, and allow a device to determine where the data is to go before it arrives. By sending this read return header information in advance of the actual data, the device has time to determine the destination for the data before it actually arrives.

Figure 3:
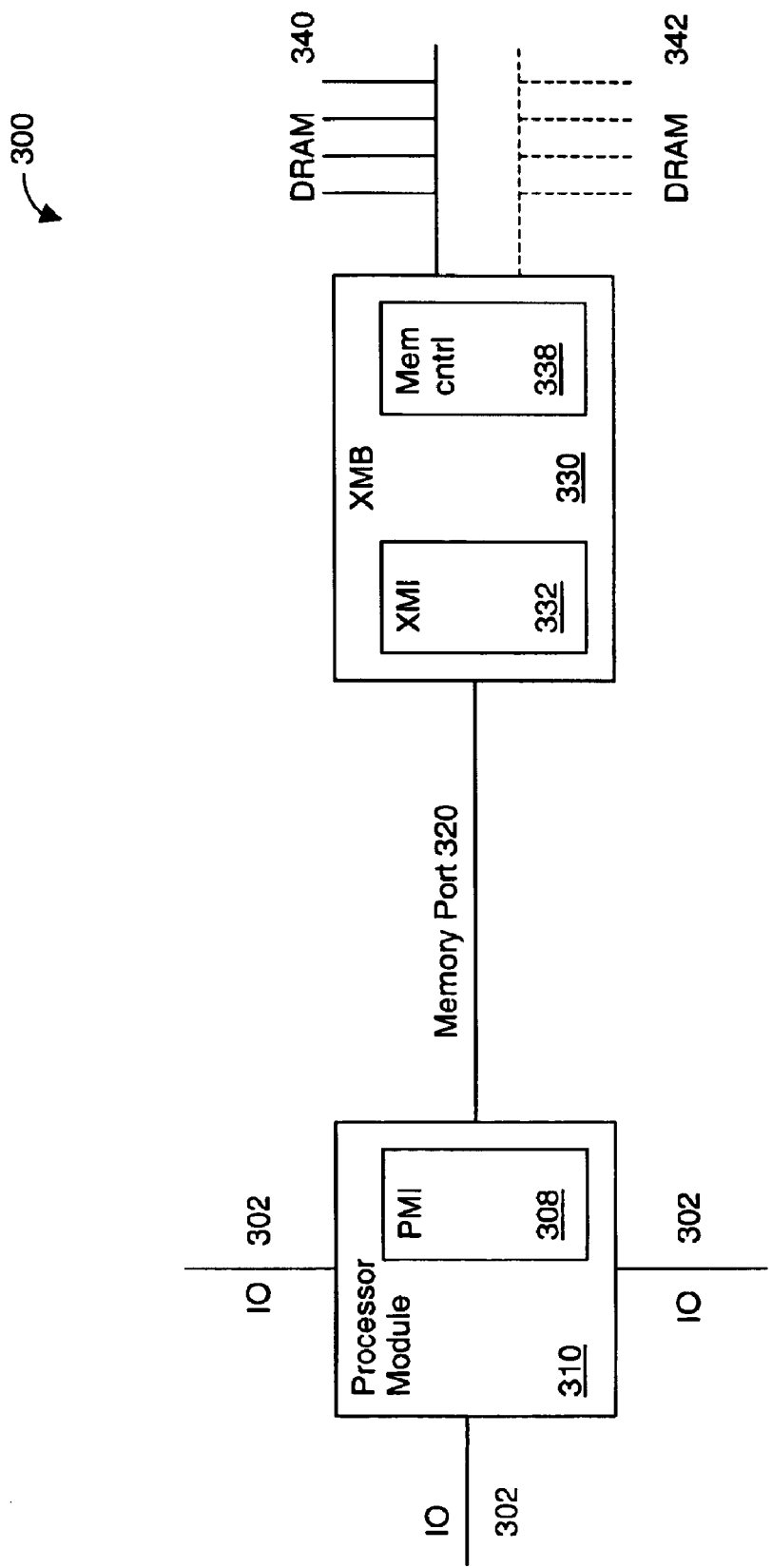
FIG. 3 illustrates, according to one embodiment, a memory port interface.

FIG. 3 illustrates in block diagram form one embodiment of a memory port interface 300. In this embodiment, the Memory Port 320 is a fast and pin-efficient interconnect between a processor (within Processor Module 310) and its local memory (340 and 342). The protocol layer of the memory port interface (sometimes referred to as memory port protocol) is independent of any particular memory technology, thereby isolating a processor from a memory technology and future memory roadmap issues. The protocol layer has specific features, the subject of this disclosure, to reduce among other things, the latency of memory requests and reduce implementation complexity.

The Processor Module 310 may have interfaces to a variety of other devices through, for example, IO 302, the Memory Port 320, etc. The Memory Port 320 may be considered a private interface from a processor module 310 to an XMB (eXternal Memory Bridge) 330, as shown in FIG. 3. The XMB 330 may contain the memory controller 338 and interfaces to native memory, such as the two banks of DRAM 340 and 342. Consequently, the XMB 330 encapsulates memory dependencies such as memory type (technology and speed), memory organization (DRAM size, number of DRAMs per module, and number of channels), and memory control (timing, refresh, and power management).

The Memory Port 320 may consist of both a physical interconnection and a protocol. The physical interconnection may consist of, or be considered, several parallel interconnects. For example, there may be a main link for data and another link layer for control (sometimes called a sideband). The protocol may consist of commands, data, responses, etc. communicated over the physical interconnection. For example, memory port commands may consist of: memory reads and writes; device reads and writes; and configuration reads and writes. In addition a link layer may have inbound and outbound information such as read return headers, write acknowledgments, status, etc.

Memory Port traffic may consist of memory, device, and configuration read and write commands. To minimize XMB 330 complexity, for one embodiment, the Processor Memory Interface (PMI) 308 initiates all data transfers. To further reduce complexity, for one embodiment, the Memory Port 320 does not support data transfers initiated by the XMB 330. In one embodiment, complexity is reduced by the Memory Port 320 not supporting I/O or graphics devices in or via the XMB 330. Additional reduction in complexity may be achieved by the Memory Port 320 not supporting any coherency traffic.

In the Processor Module 310, the Memory Port 320 includes functionality encapsulated in the PMI 308. The PMI 308 may include such things as write buffers, flow control, error handling, and control and status registers, etc. At the XMB 330, the Memory Port 320 may include such functionality encapsulated in the eXternal Memory Interface (XMI) 332. The XMI 332 may also include read and write buffers, error logging, control and status registers, etc.

In one embodiment, the Memory Port 320 may exploit the knowledge that the memory traffic is only memory reads and writes and may thus optimize for memory requests, maximizing performance while minimizing complexity. This disclosure describes two such optimizations in Memory Port 320 relating to reducing the latency of launching read requests to memory and a third optimization related to the use of a sideband read return header in the Memory Port 320.

Figure 4A:
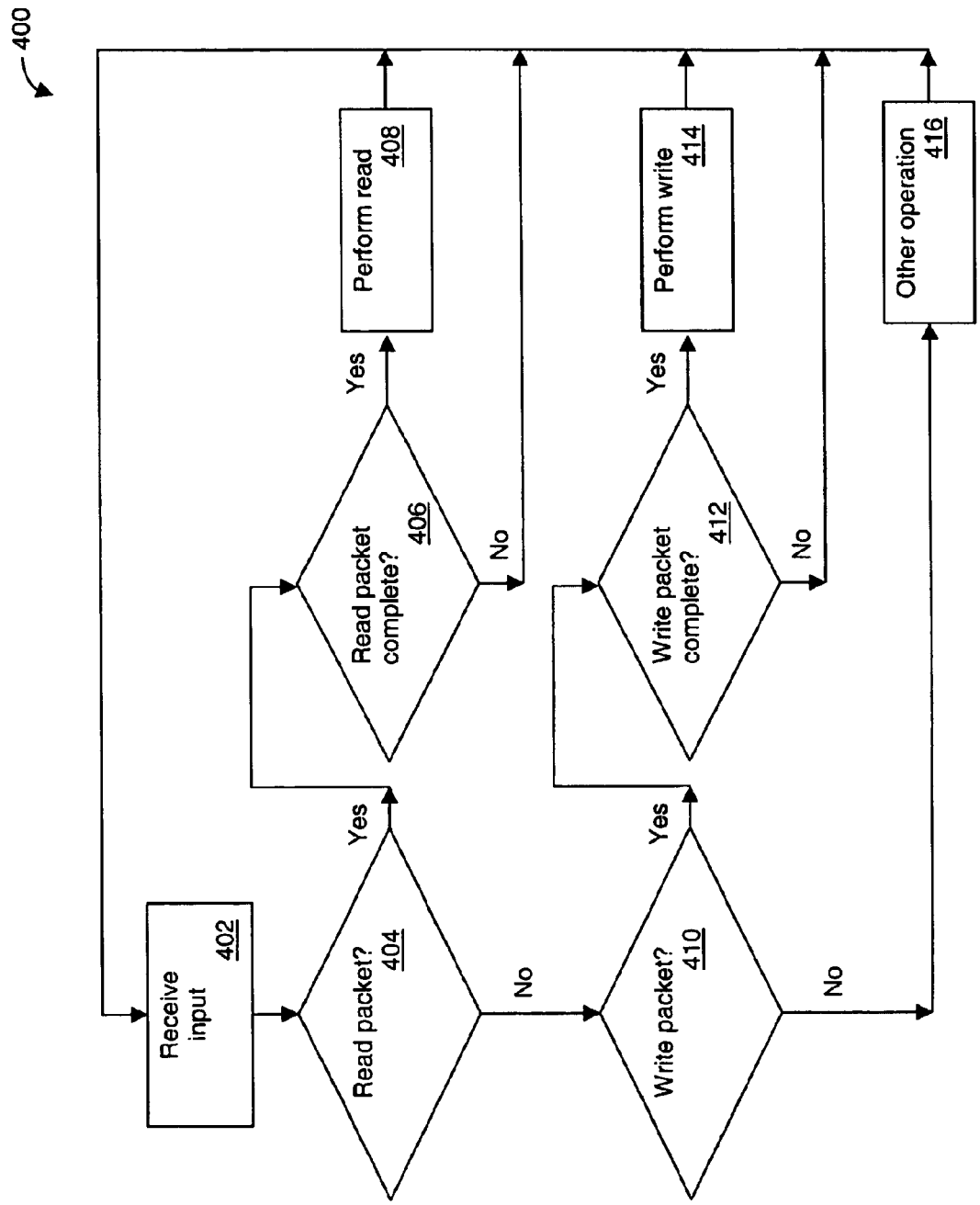
FIGS. 4A and 4B illustrate two embodiments for a read request packet preempting a write request packet.

FIG. 4A illustrates 400 how a read packet may preempt a write packet. A read packet may contain a read command and an address or range of addresses to read. Similarly, a write packet may contain a write command, an address or range of addresses to write, and the data to write (write data). The read and/or write packet, because of the amount of information being transferred and the width of the communications channel may be sent in more than one transfer. Because, the write packet has additional information in the form of the data to be written, it can be seen that the write packet may require more transfers than the read packet.

At 402 an input is received. At 404 it is determined if the input received at 402 is part of a read packet. If it is part of a read packet then at 406 a check is made to see if the read packet is complete. If the read packet is complete, then a read is performed at 408, then at 402 another input is received. If at 406 it is determined that the read packet is not complete, then at 402 another input is received.

If at 404 it is determined that the received input 402 is not part of a read packet, then it is determined at 410 if the input received at 402 is part of a write packet. If the received input 402 is not part of a write packet then at 416 some other operation is performed, then at 402 another input is received. If at 410 it is determined that the received input 402 is part of a write packet, then at 412 a determination is made if the write packet is complete. If the write packet is complete, then a write is performed at 414, then at 402 another input is received. If at 410 it is determined that the received input at 402 is not part of a write request packet then some other operation 416 may take place and then back to 402 to receive input.

Thus, it is possible for a read packet to preempt a write packet. For one embodiment, the read packet consisting of a read command and the address or addresses to read may be a single transfer or a single flit. The write packet consists of a single transfer having the write command, the address or addresses to write, and other, possibly multiple, transfers with the associated write data. For convenience in description, the read packet containing the read command and the address or addresses to be read is referred to as a read request. Thus, a read request and a read packet convey the same information. For convenience in description, that part of the write packet containing the write command and the address or addresses to write is referred to as a write request. The data part of the write packet is referred to as the write data. Thus, a write packet contains a write request and write data.

So, for example, assume a write request is received at 402. It goes to 404 and not being part of a read packet goes to 410. At 410 it is part of a write packet and so proceeds to 412. At 412 it is determined that it is only the write request and that the write data has not been received, so the write packet is not complete, so it then goes back to 402. If at 402 a read request is now received, then it goes to 404 where it is determined that the read request is part of a read packet so it proceeds to 406. At 406 a determination is made as to if the read packet is complete. In this embodiment, we have defined the read request to contain the complete read packet and so at 408 a read is performed, and then back to 402. In this example then, the write operation started (by receipt of the write request) has not been completed and the read request has preempted the write.

Following the flow of FIG. 4A, one is to appreciate that the read request may preempt a write anywhere up until the last of the write data is received. Thus, for example if a write packet contains the write request and 4 transfers of write data, a read request may preempt a write packet if received after; the write request, the first, second, or third write data.

In another embodiment, the read request may not contain a complete read packet. In such an embodiment, a check for a complete read packet at 406 may not be complete and under that circumstance, it would proceed to 402 to receive another input. If and when a complete read packet was received then at 406 it would proceed to 408 and perform the read, and then return to receiving an input at 402.

Allowing the read request being received after the write request or write data to preempt the earlier received write request or write data results in the read being executed ahead of the write. This allows the memory to respond to the read request faster than if it had to first respond to the write and then the read request.

It is to be understood that the agent sending the read and/or write requests may prevent ordering hazards. That is, the sending agent may want to limit how the read and write requests may be issued. For example, the sending agent may decide for the sake of reducing complexity that one read request may not preempt another read request.

Figure 4B:
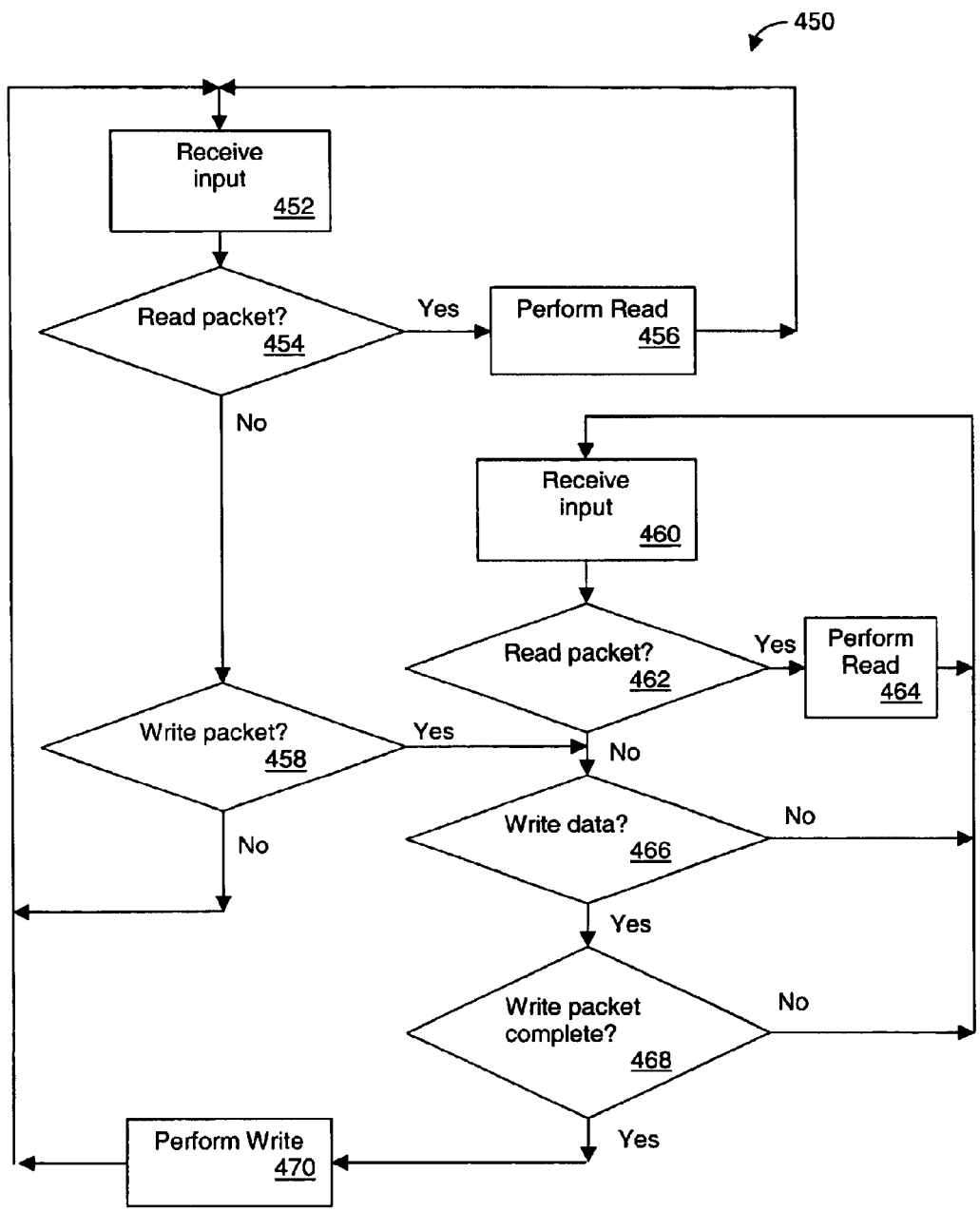

FIG. 4B illustrates 450 another embodiment of the present invention in which a read packet may preempt a write request. In this example, we consider only read and write packets. Additionally, FIG. 4B illustrates an embodiment in which a write packet may be preempted by a read request but not by another write request as was possible in FIG. 4A. In FIG. 4B an input is received at 452. At 454 a check is made to see if it is a read packet. If it is a read packet then at 456 a read is performed and we return to receiving an input at 452. If the input received at 452 is not a read packet then at 458 is it checked to see if tis a write packet. If it is not a write packet then we return to receiving an input at 452. On the other hand, if at 458 the packet is a write packet then we enter an "inner loop" of operations labeled 460–470.

This inner loop allows for read packet preemption as can be seen at 460 receiving an input 462 checking it for a read packet and if it is then performing the read 464 and going back to receiving an input 460. However, the only way back to the outer loop (452–458) is when a write packet is complete 468 and a write is performed 470. Upon entering the inner loop from 458 a check is made at 466 to determine if there is write data. If there is no write data then we proceed to receive input at 460. If there is write data then at 468 a check is made to see if the write packet is complete. If the write packet is not complete then we proceed to receive input at 460. However, if the write packet is complete, then at 470 a write is performed and then we proceed to receive input from the outer loop at 452. Thus, FIG. 4B illustrates an embodiment in which only a single write packet is allowed to be preempted by a read request (in a read packet) or multiple read requests (i.e. loop 460, 462, 464 being traversed one or more times before a write at 470).

In the discussion above, we detailed how, for example, the read request may contain a read command and the address or addresses to be read. Additionally, other information may be conveyed as well, for example, error correcting bits to assure the integrity of the request, control information, etc. For convenience in discussing the invention, the term 'flit' is used to denote a unit of information transmission associated with an entity or operation and may consist of one or more transfers. Packets may consist of one or more flits. So, for example, a read request packet may consist of a single flit denoting all the information associated with the read request. This information, depending upon a specific implementation, may require more than one transfer to completely send. For example, if the read request flit contained 32 bits of information and the computer bus could effect a 16 bit transfer, then two transfers would be required to effect the transfer of the read request flit. Described below are more details and examples of flits and transfers.

Figure 5:
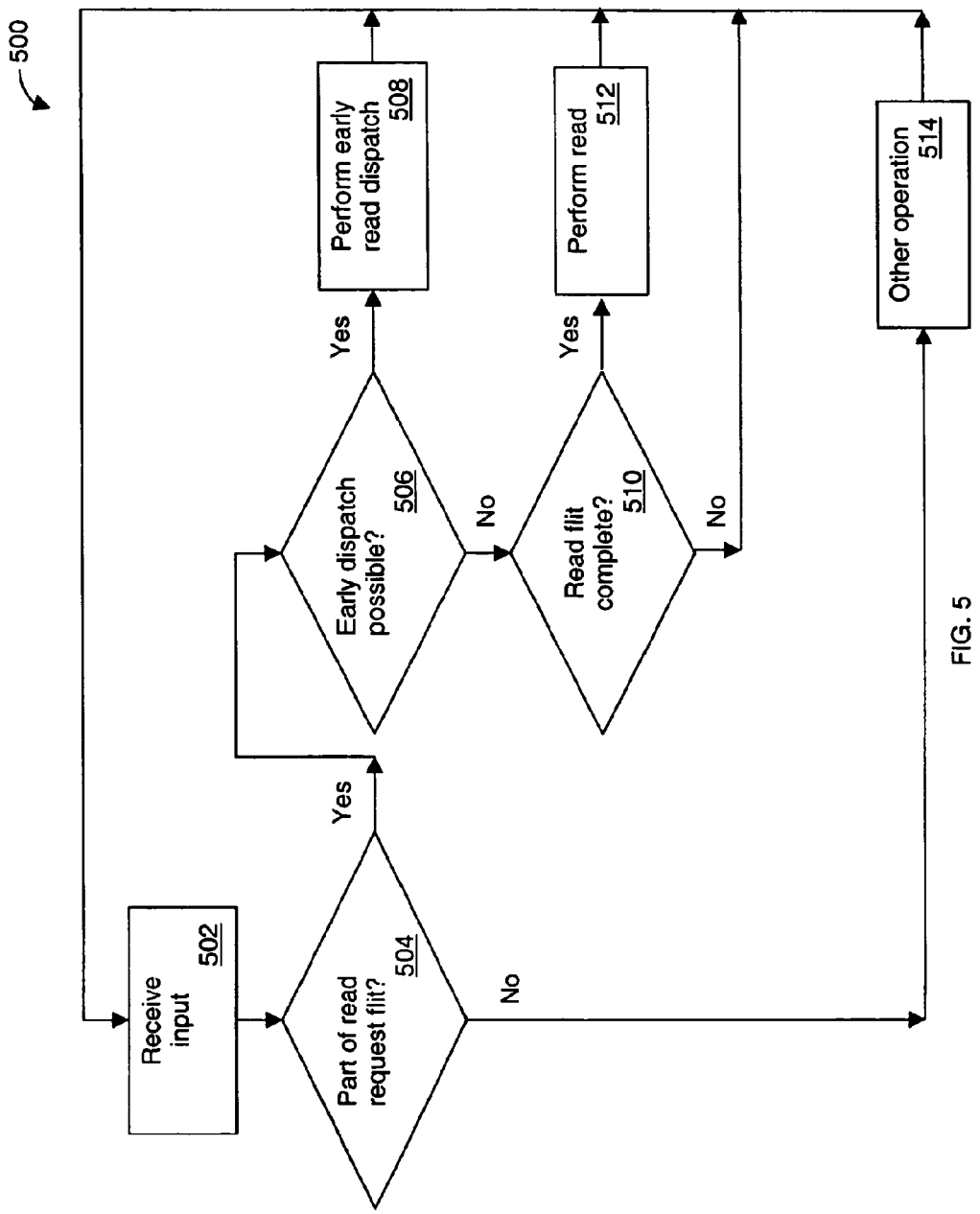
FIG. 5 illustrates, according to one embodiment, dispatching an early read request to memory.

FIG. 5 illustrates 500 dispatching an early read request to memory. Here at 502 an input is received. At 504 it is checked to see if the received input at 502 is part of a read request flit. If it is, a check is made at 506 to see if an early dispatch of the read is possible. If an early dispatch is possible then at 508 a early read dispatch is performed and then back to 502 to receive input. If an early dispatch is not possible then at 510 a check is made to see if the read flit is complete. If it is complete, then at 512 a read is performed and then back to 502 to receive input. If the read flit is not complete then back to 502 to receive input. If at 504 it is determined that the received input at 502 is not part of a read request flit then some other operation 514 may take place and then back to 502 to receive input.

During receiving the read request flit, a dispatching of an early read request to memory may be made. Thus, the entire read request flit does not have to be received before dispatching an early read request to memory. By not having to wait for the entire read request flit to be received, this allows the memory to respond to the early read request faster than if it was necessary to wait for the entire read request flit to be received before issuing a read request. Thus if the first portion of a flit contains an early read request the memory may be accessed while at the same time the second portion of a flit possibly having modifier information for the memory contents is being received. This modifier information may affect what memory data is eventually sent.

Figure 6A:
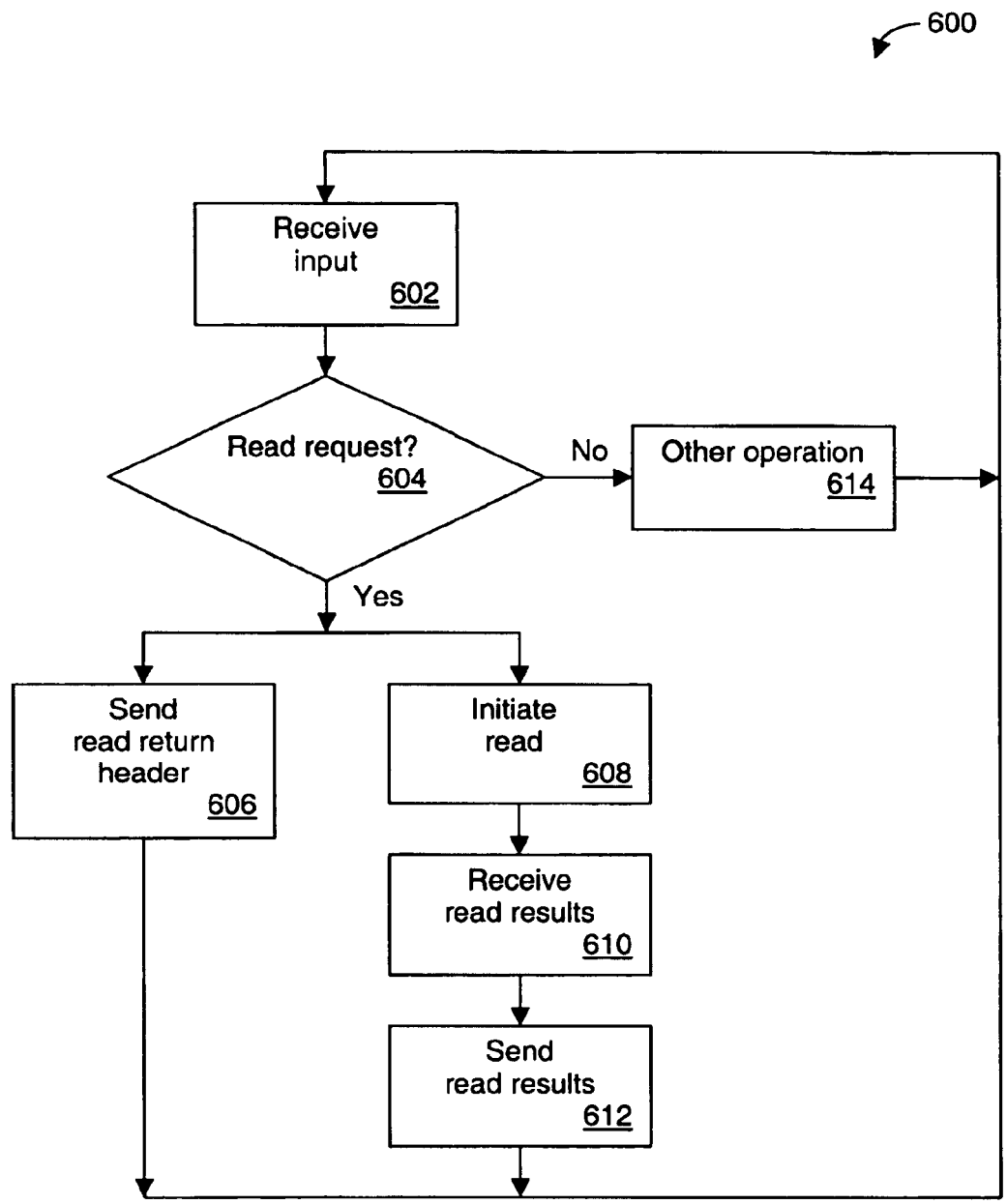
FIGS. 6A and 6B illustrate two embodiments for sending a read return header.

FIG. 6A illustrates 600 sending a read return header 606. Here at 602 an input is received. At 604 it is checked to see if it is a read request. If it is not a read request then an other operation 614 is possibly performed and back to 602 to receive input. If the input received at 602 is determined at 604 to be a read request then two things happen. First, at 606 a read return header is sent, and back to 602 for input. Second a read is initiated at 608, read results are received at 610, the read results are sent at 612, and then back to 602 to receive input. Thus, for example, a memory read initiated at 608 and a read return header sent at 606 may happen at substantially the same time and/or the read return header may just precede the sending of the read results. Thus, the entire read result does not have to be received before sending a read return header 606. By not having to wait for the entire read result, this allows the memory and/or system to send a read return header 606 earlier than if it was necessary to wait for the entire read request to be received before sending a read return header.

Figure 6B:
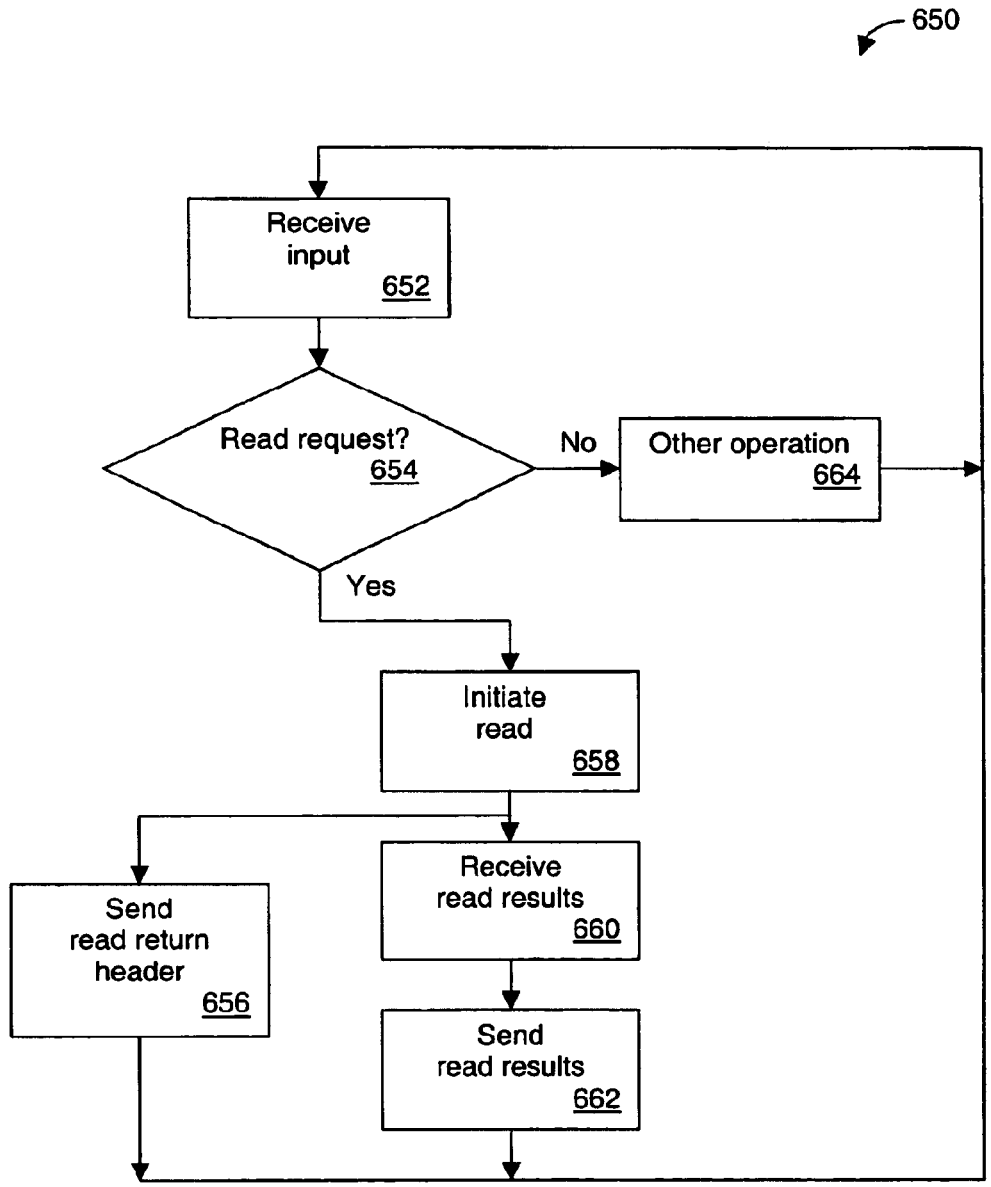

FIG. 6B illustrates 650 another embodiment for sending a read return header 656. Here at 652 an input is received. At 654 it is checked to see if it is a read request. If it is not a read request then an other operation 664 is possibly performed and back to 652 to receive input. If the input received at 652 is determined at 654 to be a read request then a read is initiated at 608. At this point two things happen. First, at 656 a read return header is sent, and back to 652 for input. Second, read results are received at 660, the read results are sent at 662, and then back to 602 to receive input. Thus, for example, a memory read initiated at 658 results in a read return header sent at 656. This header is sent in parallel with receiving 656 and sending the read results 662 and so the read return header may precede the sending of the read results. Thus, the entire read result does not have to be received before sending a read return header 606. By not having to wait for the entire read result, this allows the memory and/or system to send a read return header 656 earlier than if it was necessary to wait for the entire read request to be received before sending a read return header.

In one embodiment of the read return header (sent at 606 or 656), the read return header has an identifier encoded within it that relates it to the read request that caused it to be sent. In this way, for example, PMI 308 may identify via the read return header identifier which read request it is associated with (and the resulting forthcoming data).

It is to be appreciated, that the actual path for transferring the read return header sent at 606 or 656, while possible in the main data path is preferably in a sideband and preferably with a known fixed offset from the data. That is, the use of a sideband path (link layer) parallel to the data path where the sideband path carries the read return header in advance of the associated read data may allow the receiving device to determine where the data is to go in advance of receiving the data. Thus, a reduction in latency may be achieved if the read return header is sent in advance of the data.

Figure 7:
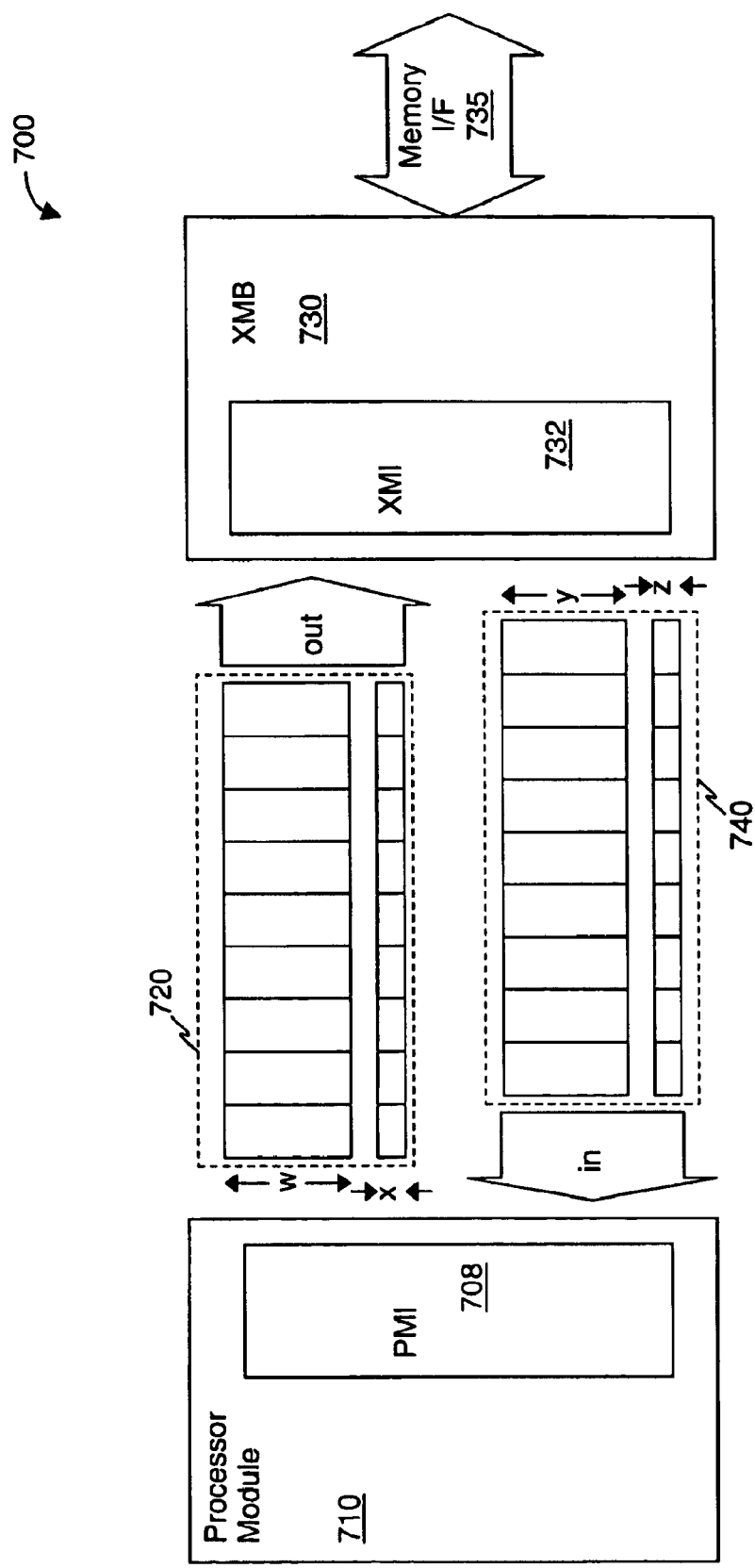
FIG. 7 illustrates, according to one embodiment, a memory port interface.

FIG. 7 illustrates one embodiment of a memory port interface 700. In this embodiment, the memory port is a full duplex interconnect (memory port link 720 and 740). In the outbound direction (away from the processor module 710 and the PMI 708) the memory port link 720 is composed of two streams of information. One stream is a data stream of width w and the second stream is a link layer stream of width x. As above, for discussing the invention, a convenient grouping of associated data and link layer information is called a flit. In the inbound direction (into the processor module 710 and the PMI 708) the memory port link 740 is composed of two streams of information. One stream is a data stream of width y and the second a link layer stream of width z.

Figure 8:
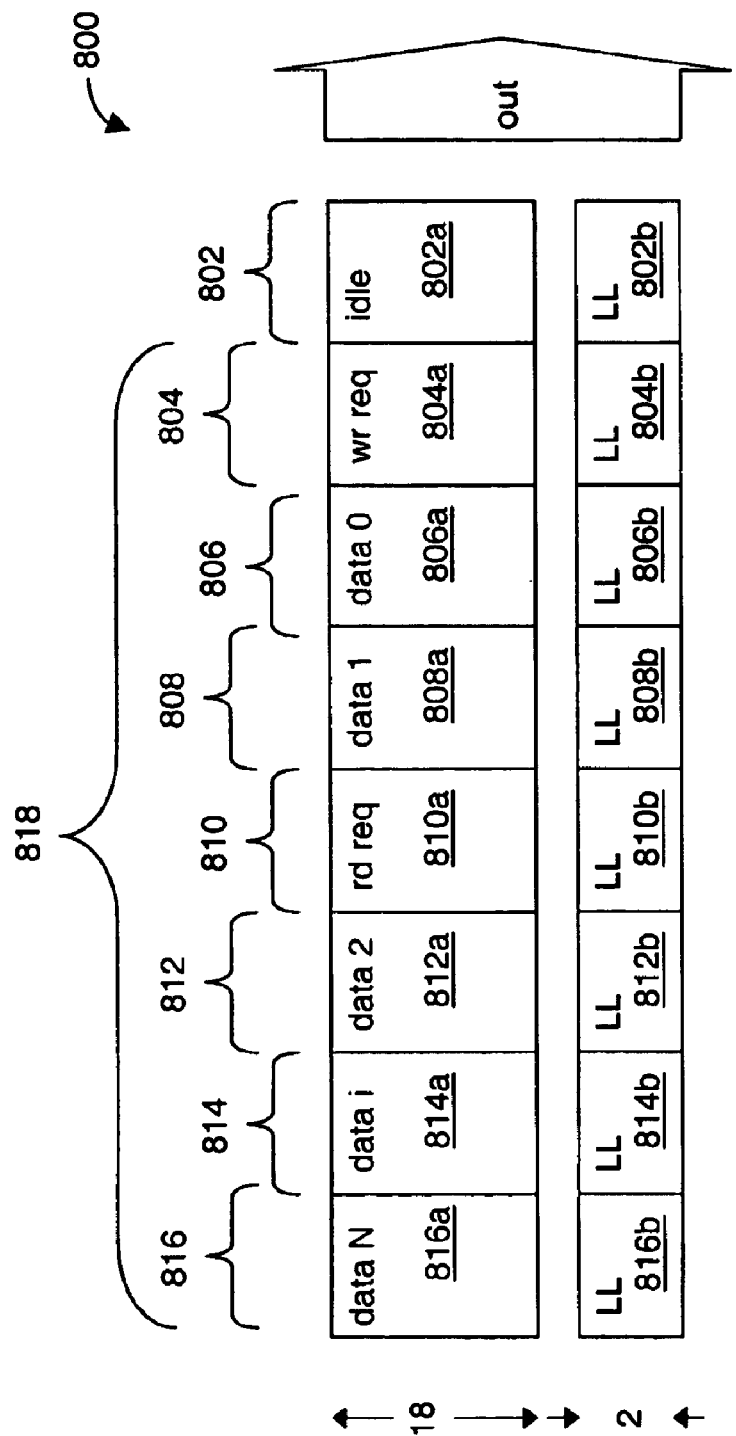
FIG. 8 illustrates, according to one embodiment, a memory port protocol.

For example, FIG. 8 illustrates one embodiment of a memory port protocol 800. In this embodiment, flit 802 is composed of data indicating an idle 802*a* and link layer (LL) 802*b* information. In similar fashion, flits 804 through 816 (generically 8XX) are composed of respective 8XXa and 8XXb parts. This embodiment illustrates one embodiment of a flit having 80 bits where the data bus width w is 18 bits wide and the link layer bus width x is 2 bits wide. The embodiment illustrated requires 4 transfers for a single flit, and there are 72 bits in the payload and 8 in the link layer.

Figure 9:
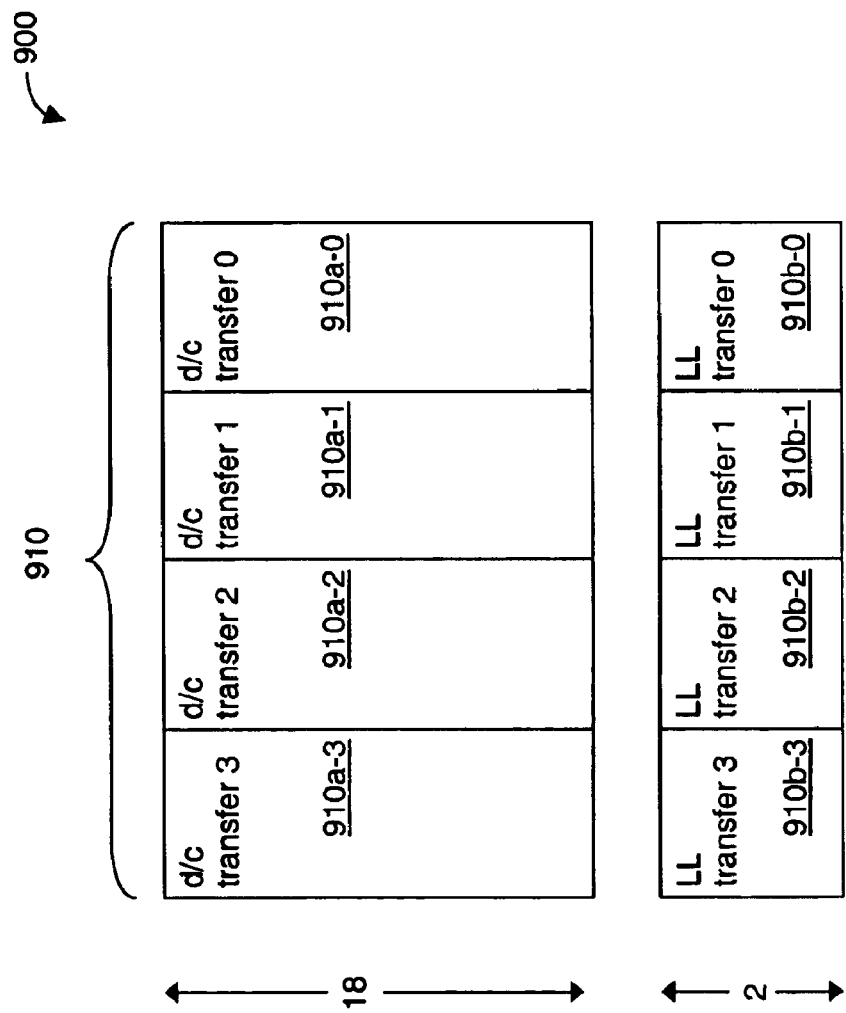
FIG. 9 illustrates, according to one embodiment, a flit requiring 4 transfers.

For example, FIG. 9 illustrates a flit 900 requiring 4 transfers. Here, the flit 910 has 72 bits of data and/or command (d/c) information and 8 link layer (LL) bits of information. Here, the transfers are done 20 bits at a time 910*a*-0 and 910*b*-0, then 910*a*-1 and 910*b*-1, etc. While, FIG. 9 shows a d/c and LL transfer occurring in the same time frame, this is not a requirement. That is, LL data that may be associated with a particular transfer within a flit may be temporally displaced from the respective d/c transfer. Additionally, the temporal displacement may be across flit boundaries.

The link layer (LL) may have, for example, control bits and cyclic redundancy check (CRC) bits. The control bits, may represent, for example, head, tail, or idle.

Referring back to FIG. 8, it should be noted that a write packet 818, would normally contain a write request and associated data only. However, in the present invention, as illustrated in FIG. 8, no such restriction is required. Write packet 818 is illustrated as having within it a write request flit 804, associated data flits 806, 808, 812, 814, and 816, as well as a read request packet flit 810.

Figure 10:
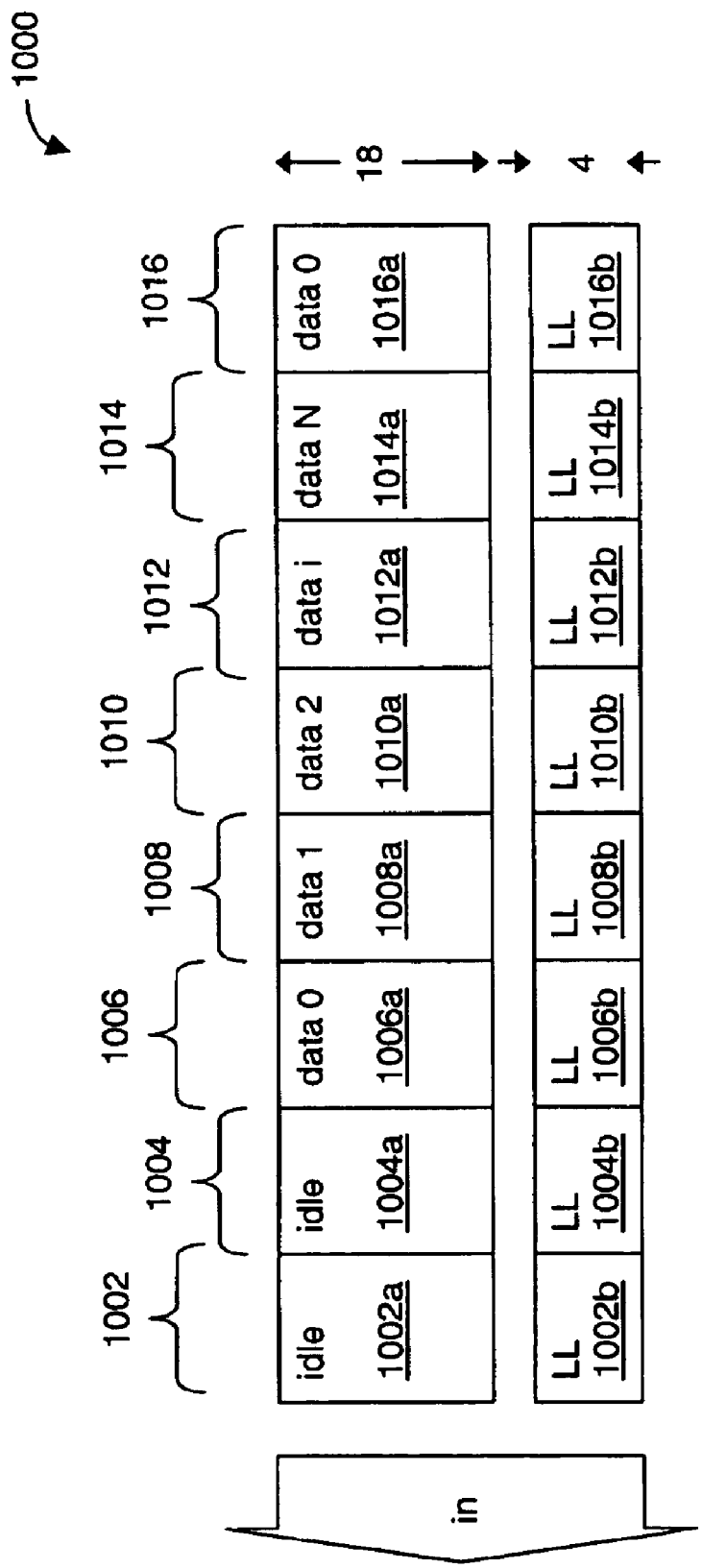
FIG. 10 illustrates, according to another embodiment, a flit.

FIG. 10 illustrates another embodiment of a flit 1000 having 96 bits where the data bus width y is 18 bits wide and the link layer bus width z is 4 bits wide. This embodiment requires 4 transfers for a single flit, and there are 64 data bits, 8 check bits, and 16 bits in the link layer. Each flit 1002 through 1016 may have a payload packet 10*xxa* and an associated link layer (LL) packet 10*xxb*. FIG. 10 may represent an input to a processor module. The link layer (LL) may have, for example, link layer control bits and CRC bits. The control bits may be, for example, read header, write header, data, data with tail, idle, write ack (acknowledgement), flow control, etc.

Figure 11:
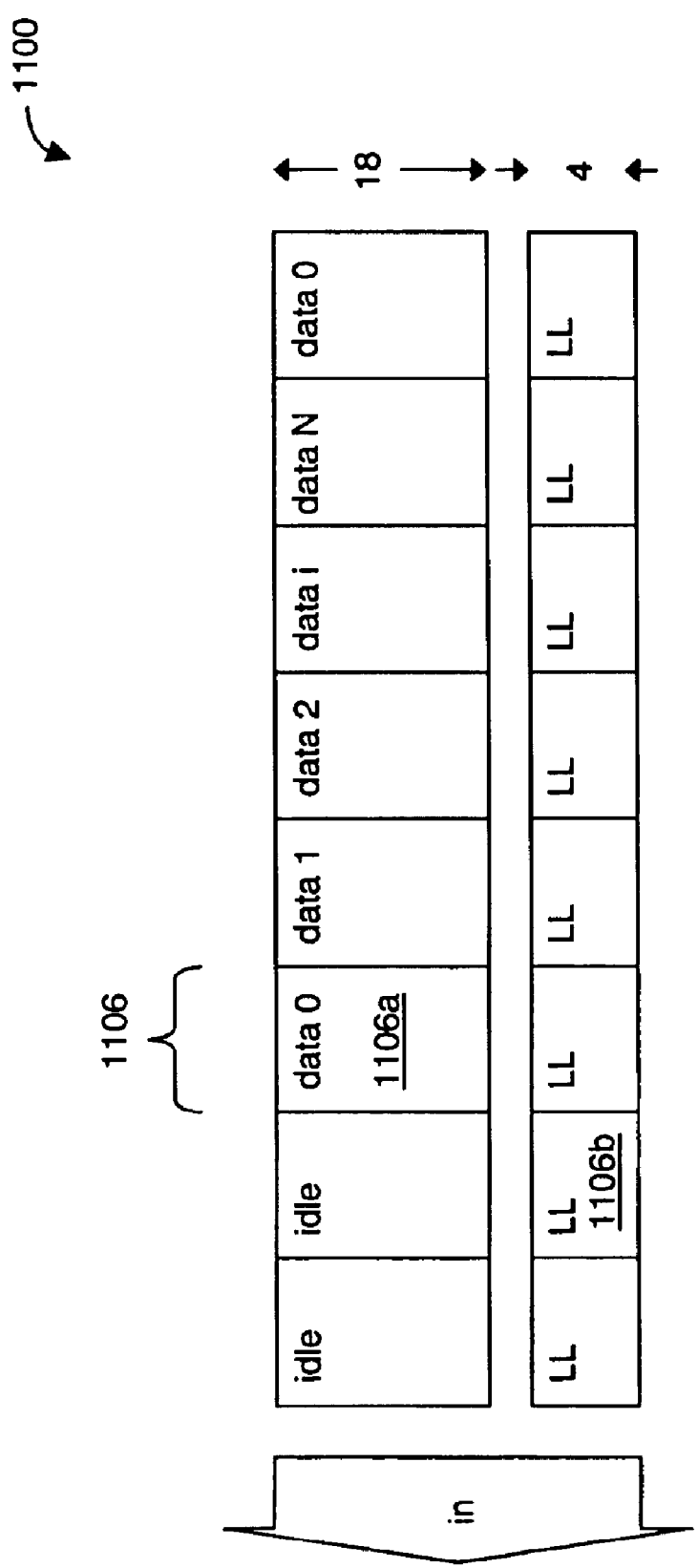
FIG. 11 illustrates, according to one embodiment, a temporal displacement of a link layer and payload in a flit.

What is to be further appreciated is that while a LL control is associated with a payload, it does not have to be sent at the same time. For example, a processor module may be able to improve performance if it has advance information that read data is to arrive shortly. Thus, for example, an early read header in the LL may provide such an indication. For example, in FIG. 10, the LL associated with flit data 1006*a* may be at a position earlier in time, for example, at position 1004*b*. Thus, a flit, such as 1106 may contain payload at position 1106*a* and a LL control at position 1106*b*, as shown in FIG. 11. Thus, FIG. 11 illustrates a temporal displacement of a link layer and payload in a flit 1100.

The inbound sideband link layer (LL) (into the PMI 308) may also contain information on other transfers and/or transactions. For example, the LL may contain write acks to acknowledge outbound write commands, stop bits for outbound flow control feedback, status indications (idle vs. data payloads, etc.), etc. Also, a LL associated with a flit may convey more than a single piece of information, for example, the LL coding may indicate either an idle payload or a non-idle payload and in addition whether it is a read return header, a write ack, a stop indication, idle control, etc. Additionally, it is to be appreciated that, as mentioned above, this information may be temporally shifted.

Temporally shifting the information may allow the reduction in complexity of the interfaces. For example, putting a read return header in-band with the read return data may impose additional functionality in the XMI 332 because the XMI 332 may have to multiplex header and data information and the XMI 332 may have to buffer incoming read return data to rate match the memory read bandwidth with the slightly higher inbound Memory Port bandwidth necessary to compensate for the bandwidth overhead of the inline header. This additional functionality may imply additional complexity and likely additional latency. Instead, by putting the read return header in the side-band temporally shifted may enable the XMI 332 data path to operate at the same frequency as a memory bus, thereby permitting the XMI 332 to operate with no buffering or multiplexing in the read return data path. Thus, the use of a sideband path (link layer) parallel to the data path where the sideband path carries the read return header in advance, possibly non-contiguously, of the associated read data may allow steering and control logic to operate in advance of the received data. A reduction in latency may be achieved if the read return header may be sent in advance of the data. The header may precede the read return data by 0 flits or more (the read return offset may be determined at initialization time). An early read return header permits the processor to move the header decode and data steering logic out of the critical path and drive incoming read return data directly to the appropriate destination within the processor.

The time (offset) by which the read return header may be sent in advance of the data may be fixed at some point in time and/or dynamic. For example, a fixed delay may be determined at system initialization time. Alternatively, the system may determine this during operation and may make it static. Another embodiment may have the offset time to the data encoded within the read return header. Thus, one skilled in the art will recognize that there are many possible embodiments.

Temporally shifting information may allow the reduction in complexity of the PMI 308 interface as well. That is, the PMI 308 may reduce complexity and/or latency if it sends information via the sideband in advance of data on the main data path. One skilled in the art will appreciate that reduced latency and/or complexity may be achieved in the outbound direction as well as the inbound direction.

Figure 12:
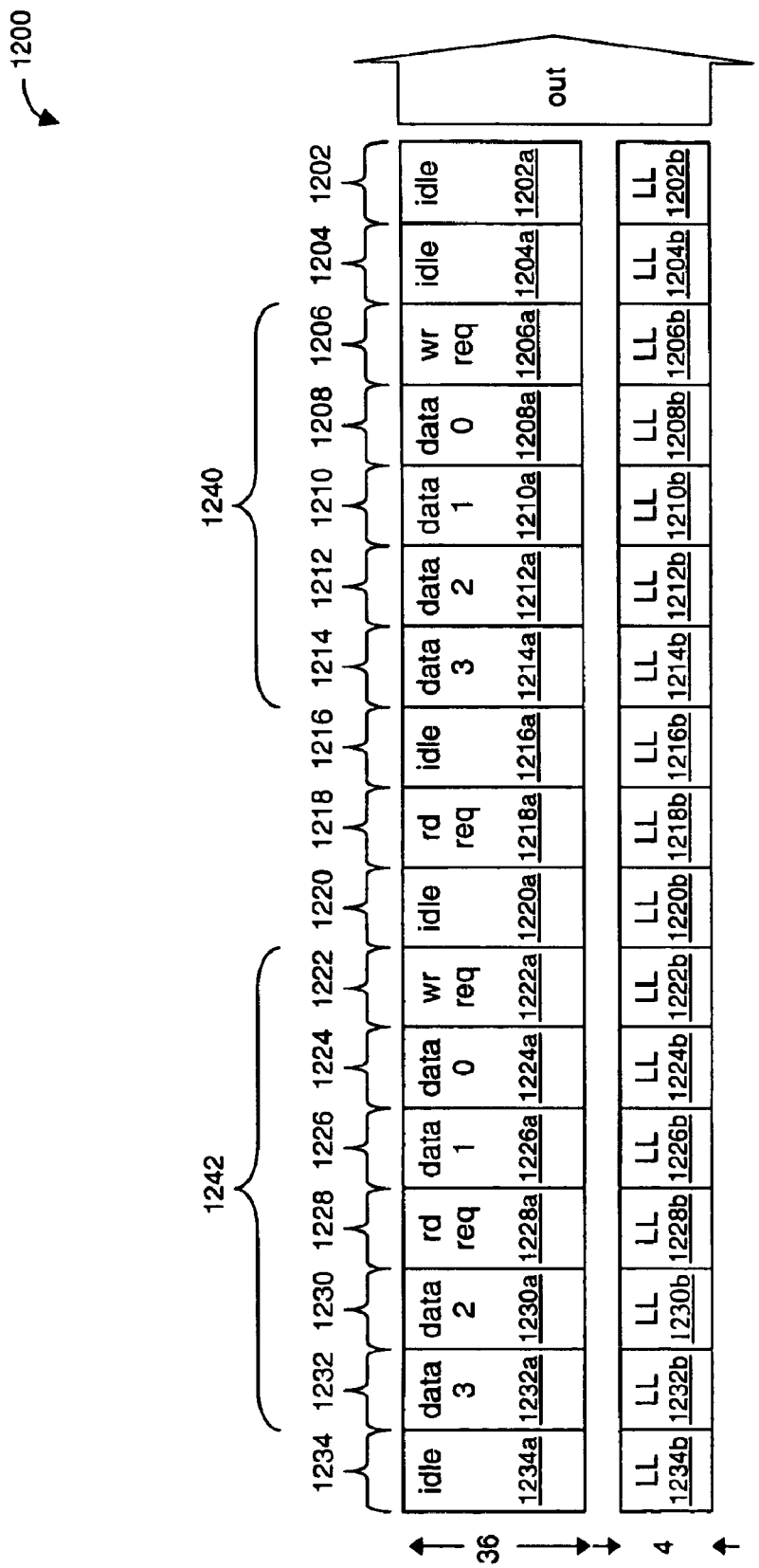
FIG. 12 illustrates, according to another embodiment, a memory port protocol.

FIG. 12 illustrates another embodiment of a memory port protocol 1200 where the data and command width is 36 bits and the link layer is 4 bits. Idle flits 1202, 1204, 1216, 1220, and 1234 may have an idle payload in their respective "a" part (1202a, 1204a, 1216a, 1220a, and 1234a) and a link layer (LL) control code in their respective "b" part (1202b, 1204b, 1216b, 1220b, and 1234b). A normal write packet 1240 has only write associated data, such as a write request 1206 flit and write data flits (1208–1214). Each flit has a LL control that may indicate additional information. For example, data 0, data 1, and data 2 (1208a, 1210a, and 1212a respectively) may have information in the link layer (LL) control (1208b, 1210b, and 1212b respectively) to indicate that the data is write data. LL 1214b may indicate that 1214a is write data and the tail of the write data. LL 1206b may indicate additional information about the write request 1206a command.

Flit 1218 shows a read request not preempting a write packet. Read request flit 1218 has an associated read request 1218a which includes a read request identification and possible additional information in the associated link layer 1218b. Alternatively, the read request identification and/or additional information may be located in 1218a and/or 1218b.

A write packet preempted by a read request is illustrated at 1228. Here, a write request packet having a write request flit 1222 and write data flits 1224, 1226, 1230, and 1232 has between the data 1 flit 1226 and the data 2 flit 1230 a read request flit 1228. This read request flit 1228, having a read request 1228a and an associated link layer 1228b has preempted the write request flit 1222.

As explained above, for the normal write packet 1240, the write request flit 1222, and associated write data flits 1224, 1226, 1230, and 1232, have an "a" payload and an associated "b" link layer control.

Detailed in the discussion below are possible embodiments for commands, field bit definitions, link layer control, etc. What is to be appreciated is that these specific examples are not to be considered limiting the prior discussion of the present invention. These examples are for illustrative purposes only.

Referring again to FIG. 3, the PMI 308 may issue Memory Port 320 memory commands and the configuration commands. In this example, the XMI 332 does not issue any commands over Memory Port 320. Additionally, partial memory writes are not shown.

There are three general types of commands: memory, device, and configuration.

Memory commands, such as read, write, and cancel, generally target main memory, either connected to and/or contained within the XMB 330 that behave as pure memory (e.g. DRAM).

Device commands, such as read and write, generally target memory locations that do not behave as pure memory. For example, writing to flash memory and/or device registers mapped into memory space where the writes (and sometimes) reads have side effects. In such cases each write command may want to execute exactly once at the target. Furthermore, such commands may want to execute at the target in the same order in which the commands are issued by the source.

Device commands are similar to memory commands and may have a size field or bits indicating the data transfer size. Possible sizes may include, for example, 1 to 8 bytes, 16, 32, or 64 bytes, and/or a full cacheline of data. Regardless of the data transfer size, the command payload may be a full cacheline in size, padded as necessary with ones and/or zeroes from the data transfer out to a cacheline.

Device commands may also have mask bits to support partial reads and/or writes. For a read command, for example, this mask may indicate which byte locations to read, and which bytes in a read return are valid. For a write command, the byte mask may indicate which bytes in the payload are valid.

Configuration commands, such as read and write, may be considered a special class of device commands that may target devices and/or registers, for example, locations in PCI configuration space. Additionally, because of the nature of the commands, the PMI 308 may choose to have only one configuration command outstanding at a time.

All the command types may share a common base format. For example, a command flit may contain a 72 bit command encoded in the flit payload as 64 command bits and 8 check bits. To minimize the latency for memory read requests, the read command format may have all the critical information in the first half of the flit, thus enabling dispatch of a read request to memory before the XMI 332 receives the entire flit.

An early indicator, for example a bit, in the command may indicate whether the first half of the flit contains sufficient information to launch a memory read request or whether the XMI 332 must accumulate the information in the entire flit. This bit may only be set for memory read commands; otherwise the XMI 332 may incorrectly launch memory read requests for configuration commands, device commands, or memory write commands. However, not all memory read commands may have the early bit set active. For example, any memory read command with specific scheduling information in the second half of the flit, e.g. stream identification or priority, may have the early bit inactive to force the XMI 332 to consider this information before dispatching a memory read request.

The command destination bits may indicate the command type: memory command, device command, or configuration command.

In one embodiment, the transaction (tag) bits, together with the Read/Write bit, comprises a unique ID for each command. A unique ID may not be re-used for a subsequent command until either the PMI 308 has received a response for any prior command of that type with the associated transaction ID or the PMI 308 has determined that any prior command of that read/write (rd/wr) type with that transaction ID has timed out.

The cancel bit is a modifier which indicates if a memory read command is canceling a previous memory read command.

In the case of memory commands, the offset bits identify an offset from the memory location specified by the address bits for memory reads and writes. In the case of device commands, this offset coupled with the address bits may specify the target location (e.g. to a memory mapped device register).

As mentioned above, the stream id/priority may be defined to encode the stream to which a memory read command belongs or the memory read command priority to enable the XMI 332 to apply different scheduling policies to different memory requests. For example, this field may indicate if a memory command belongs to an isochronous stream and therefore may require a specific service time to meet the isochronous data delivery deadline time.

The mask bits may be a bit vector byte mask indicating which bytes are valid in partial reads and writes for device and configuration commands.

The size bits may indicate the data transfer size for device and configuration commands. Possible data transfer sizes for such commands are: 1 to 8 bytes (in conjunction with the mask bits), 16 bytes, 32 bytes, 64 bytes, etc., and full cacheline size.

The integrity of each command may be protected using an Error Correcting Code (ECC) over the 72 bit command with check bits distributed in the second half of the flit. However, until the entire command flit has been received and the ECC error check has been completed the XMI 332 may wish to regard the early bit as a hint and any memory read request dispatched early for the command as speculative. Consequently, the XMI 332 may want to ensure that it has sufficient resources to handle such a speculative early memory read request before it is dispatched. For example, the XMI 332 must ensure that dispatching an early read request cannot lead to an overflow of the memory controller read request queue.

For the write command fields, to simplify encode and decode in this embodiment, these fields may be the same as for the read command except for the offset and code fields.

FIG. 13 illustrates one embodiment of a memory command format 1300. In this example, we assume a physical layer with four transfers per flit and 18 bits per transfer. That is, the command has 72 bits delivered in 4 transfers. Assume further that each transfer (Transfer 0,1,2,3) corresponds to one bit cell time across the interconnect. For example, during the first transfer (Transfer 0), lower order address bits and a read/write command may be transferred. During Transfer 1 higher order address bits and an early read indicator may be transferred. During Transfers 2 and 3, bits indicating command destination, offset from address, transaction ID, check, mask, stream ID, size, cancel command, priority, etc., may be transferred.

FIG. 14 illustrates one embodiment of a device command format 1400 wherein we assume a physical layer with four transfers per flit and 18 bits per transfer. Here, during Transfer 0, lower order address bits and a read/write command may be transferred. During Transfer 1 higher order address bits and the early read indicator may be sent. During Transfers 2 and 3, information may be transferred indicating command destination, offset from address, transaction ID, check bits, mask bits, size of transfer, etc.

FIG. 15 illustrates one embodiment of a configuration command format 1500 wherein we assume a physical layer with four transfers per flit and 18 bits per transfer. During Transfer 0, lower order configuration address bits and a read/write command may be transferred. During Transfer 1 higher order configuration address bits and the early read indicator may be sent. During Transfers 2 and 3, information may be transferred indicating command destination, offset from address, transaction ID, check bits, mask bits, etc.

As previously mentioned, the link layer (LL) has both an outbound format and an inbound format. FIG. 16 illustrates one embodiment of an outbound link layer format 1600. The base outbound link layer format may have, for example, 8 bits per flit. This base format may be optionally extended, for example, by another 8 bits to a total of 16 bits per flit. FIG. 16 shows the 16 bits per flit format. LL signal 0 is used for communicating information (info) bit and check bits sent during Transfers 0:3 (four transfers: 0, 1, 2, and 3). The info bit(s) may indicate if the flit is non-idle, i.e. whether the flit contains command or data, or is idle. LL signal 1 is used for communicating header, tail, and check bits. The tail bit indicates the end of the packet and the header bit indicates if the flit contains a command. The header and tail bits may encode other states, such as: flit payload is data and is not the last data payload in the packet; flit payload is a data payload and the last flit of the packet; flit payload is a write command; and flit payload is a read command and the last flit of the packet. The check bits comprise a CRC computed over the 16 bits of the link layer format. The extended mode bits are sent on LL signals 2 and 3.

Extended mode bits may also be in the link layer and may be used for data flits with lockstep Memory Ports. To support error checking in the XMI (332) with lockstep Memory Ports, the extended mode bits may encode the error syndrome of the half cacheline sent to the other Memory Port.

An inbound link layer may have a variety of formats. For example, in one embodiment, there may be four different inbound link layer formats: read return header, write acknowledgment, status, and configuration. In the embodiments described below, it is possible for these four link layer formats to share a number of bits in common. FIG. 17 illustrates one embodiment of common inbound link layer format bits 1700.

The info bit indicates if the flit payload is non-idle, i.e. contains data, or is idle. The check bits comprise a CRC computed over the 16 bits of the link layer format.

The type bits may indicate one of four different inbound link layer formats, such as: read return header; write acknowledgement; status; and configuration.

FIG. 18 shows one embodiment of a read return header format 1800. Here, the tag bits, may encode a transaction ID in, for example, little endian order. The control bit may indicate that the read return has data and the first data payload flit begins a given offset flits from the beginning of the current flit. If the offset is 0, the first data payloads begins in the current flit. The control bit may also indicate that the read return header is a nack (short for negative acknowledgement), in which case there is no associated data. The read return nack informs the PMI 308 that the XMI 332 has cancelled the original memory read command as a result of receiving a read cancel command and thus the PMI 308 must not expect read return data for the read command. The XMI 332 only sends a read return nack if it cancels a read command. Thus, the XMI 332 does not send a read return nack if it discards a read cancel command without canceling a read command.

FIG. 19 shows one embodiment of a write acknowledgement format 1900. In this example, except for the absence of the control bit, this format is the same as for the read return header discussed above.

FIG. 20 shows one embodiment 2000 of a status format. The Memory Port 320 may use the status format for three functions: return of outbound flow control information to the processor; conveying an asynchronous signal; and indicating the link layer is idle for a flit.

If the stop bit is active, the processor must not send any write commands to the XMI 332 until the processor receives a subsequent flit with link layer status format and with the stop bit inactive. The XMI 332 asserts the stop bit when it wishes to flow control incoming write commands, e.g. when the XMI 332 write buffer exceeds a given threshold. If the stop bit is inactive, the processor may send write commands to the XMI 332.

The signal bits may comprise a signal code. The XMI 332 may asynchronously signal some action by the processor, in parallel with read return data, by setting the signal code appropriately.

One skilled in the art, will recognize, from the examples of the above embodiments that a configuration format may be similarly encoded to provide functionality for the inbound link layer to convey configuration information.

These embodiments are described in sufficient detail to enable those skilled in the art to practice the invention, and it is to be understood that other embodiments may be utilized and that logical, mechanical, electrical, and other changes may be made without departing from the scope of the present invention. It is to be appreciated that the architecture and functionality described above may have other embodiments. Any of the formats, commands, etc. may have different bit assignments as well as different definitions for bits. For example, the read return header format may have different bit assignments as well as different definitions for bits and the order may be big endian rather than little endian.

Additionally, while for sake of clarification in the description some aspects of the present invention where described in embodiments with respect to inbound and outbound directions, it is to be understood that they may be applicable to both inbound and outbound. For example, link layer data that may be associated with a particular transfer within a flit may be temporally displaced from the respective transfer and this transfer may be in an inbound and/or outbound direction. For example, PMI 308 may issue a header that is sent via the link layer to the XMI 322 in advance (by an offset) of the information.

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

It is understood by those knowledgeable in the art, that an implementation using a computer may require, at power up or reset that the computer configure itself properly before performing a method or task as an apparatus. This is normally referred to as initialization and may include, but is not limited to, setting timings of chips, determining devices attached, configuring subsystems, such as memory, checking accessing speeds, checking interconnects, etc. What is to be understood is that in preparation for fully functional operation, a computer system may perform many checks, set many parameters, etc. For example, a computer may, at initialization, determine attached memory and vary settings and parameters to determine the optimum interface speeds, timing settings, etc. Additionally, the computer while operating may also perform checks to assure proper operation and if necessary change settings, etc.

Thus, a method and apparatus for the optimization of memory read operations via read launch optimizations in memory interconnect have been described.

What is claimed is:

1. A method comprising:
   receiving a write request in parts;
   receiving a read request within a write packet; and
   preempting transfer of write data with the read request by not completing the write request until all of the parts of the write request are received.

2. The method according to claim 1, wherein the read request preempting the write data is received in time after the write request.

3. The method according to claim 1, wherein the read request and write request each have an associated link layer control.

4. The method according to claim 1, wherein the read request is selected from the group consisting of a memory read request, a device read request, and a configuration read request.

5. The method according to claim 1, wherein the write request is selected from the group consisting of a memory write request, a device write request, and a configuration write request.

6. An apparatus comprising:
   a memory system having an input, an output, and a control;
   a memory port having a memory input, a memory output, a memory control, a processor input, a processor output, and a processor control, wherein the memory system input is coupled to receive the memory port memory output, the memory port memory input is coupled to receive the memory system output, and the memory system control is coupled to the memory port memory control, and
   a processor having a memory output, a memory input, and a memory control, wherein the memory port processor input is coupled to receive the processor memory output, the processor memory input is coupled to receive the memory port processor output, and the processor memory control is coupled to the memory port processor control;
   wherein the memory port has a memory port protocol allowing a processor write request received in parts to be preempted by a processor read request by not completing the write request until all of the parts of the write request are received, and wherein the read request is within a write packet.

7. The apparatus of claim 6, wherein the memory port protocol further comprises a payload packet and an associated link layer control packet.

8. A machine-readable medium having stored thereon instructions, which when executed causes a system to:
   issue a write request in parts;
   issue a read request within a write packet; and
   preempt transfer of write data with the read request by not completing the write request until all of the parts of the write request are received.

9. The machine-readable medium according to claim 8, wherein the read request and the write request each further comprise an associated link layer control.

10. A system comprising:
   a processor capable of issuing a read request within a write packet, and a write request in parts; and
   a memory device coupled to the processor wherein processor transfer of write data is preempted by the processor read request by not completing the write request until all of the parts of the write request are received.

11. The system of claim 10, wherein the read request and write request each further comprise an associated link layer control.

12. An apparatus comprising:
   means for receiving a write request in parts;
   means for receiving a read request within a write packet; and
   means for preempting transfer of write data with the read request by not completing the write request until all of the parts of the write request are received.

13. The apparatus of claim 12, wherein means for preempting the write data with the read request is a means for receiving a link layer control associated with the read request.

14. The apparatus of claim 12, wherein means for preempting the write data with the read request is a means for receiving a link layer control associated with the write request.

15. A method comprising:
   receiving a read request flit within a write packet; and
   dispatching an early read request from a read request flit to a memory from the request flit during the receiving.

16. The method according to claim 15, wherein dispatching the early read request to the memory occurs after receiving a first half of the read request flit.

17. The method according to claim 16, wherein the first half of the flit has an indicator for early dispatch of the early read request to the memory.

18. The method according to claim 17, wherein the indicator for early dispatch of the read request is selected from the group consisting of early dispatch of read allowed and early dispatch of read not allowed.

19. An apparatus comprising:
   a memory system having an input, an output, and a control; and
   a memory port having a memory input, a memory output, and a memory control, wherein the memory system input is coupled to receive the memory port memory output, the memory port memory input is coupled to receive the memory system output, and the memory system control is coupled to the memory port memory control;
   wherein the memory port has a memory port protocol supporting an early read request by dispatching the read request from a read request flit to a memory while receiving the read request flit, and wherein the read request flit is within a write packet.

20. The apparatus of claim 19, wherein the early read request is located within a first half of a read request flit.

21. A machine-readable medium having stored thereon instructions, which when executed causes a system to:
   receive a read request flit within a write packet; and
   dispatch a read request from the read request flit to a memory while the read request flit is being received.

22. The machine-readable medium according to claim 21, wherein dispatching the read request to the memory occurs before receiving the entire read request flit.

23. The machine-readable medium according to claim 22, wherein the first half of the flit has an indicator for early dispatch of the read request to the memory selected from the group consisting of early dispatch of read allowed and early dispatch of read not allowed.

24. A system comprising:
   a processor capable of issuing an early read request from a read request flit, wherein the read request flit is within a write packet; and
   a memory device coupled to the processor capable of receiving the early read request and performing an early read of a memory while the read request flit is being received.

25. The system of claim 24, wherein the processor early read request is issued within a first half of a read request flit packet.

26. The system of claim 25, wherein the first half of the read request flit packet has an indicator for early dispatch of the read request to the memory device selected from the group consisting of early dispatch of read allowed and early dispatch of read not allowed.

27. An apparatus comprising:
   means for issuing an early read request from a read request flit, wherein the read request flit is within a write packet; and
   means for a memory device to receive the early read request and perform an early read of a memory while the read request flit is being received by the memory device.

28. The apparatus of claim 27, wherein means for issuing an early read request is a means for setting an indicator in a first half of a reed request flit.

29. The apparatus of claim 27, wherein means for performing the early read of the memory is controlled by an indicator selected from the group consisting of early dispatch of read allowed and early dispatch of read not allowed.

30. A method comprising:
   receiving a first half of a read request flit within a write packet; and
   dispatching a read request from the read request flit to a memory before receiving a second half of the read request flit.

31. The method according to claim 30, wherein dispatching the read request to the memory occurs before receiving a second half of the read request flit.

32. The method according to claim 30, wherein dispatching the read request to the memory occurs before error checking an entire read request flit.

* * * * *